(12) United States Patent
Berry

(10) Patent No.: US 6,283,848 B1
(45) Date of Patent: Sep. 4, 2001

(54) POULTRY FOOT HARVESTER AND METHOD

(76) Inventor: Allan Todd Berry, 5441 Britt Whitmire Rd., Gainesville, GA (US) 30506

( * ) Notice: Subject to any disclaimer, the term of this patent is extended or adjusted under 35 U.S.C. 154(b) by 0 days.

(21) Appl. No.: 09/616,595

(22) Filed: Jul. 14, 2000

(51) Int. Cl.$^7$ .................................................. A22C 21/00
(52) U.S. Cl. .......................................... 452/166; 452/167
(58) Field of Search ..................................... 452/166, 167

(56) References Cited

U.S. PATENT DOCUMENTS

| | | |
|---|---|---|
| 3,115,667 * 12/1963 | Lis et al. ............................... | 452/166 |
| 3,199,143    8/1965 | Ousley et al. . | |
| 3,405,423   10/1968 | Vertegaal . | |
| 3,522,622 *  8/1970 | Crane ..................................... | 452/167 |
| 3,696,464   10/1972 | Dillon et al. . | |
| 3,755,854 *  9/1973 | van Mil ............................... | 452/167 |
| 4,102,015    7/1978 | Herrick . | |
| 4,709,448 * 12/1987 | McGuire et al. ..................... | 452/167 |

* cited by examiner

*Primary Examiner*—Willis Little
(74) *Attorney, Agent, or Firm*—B J Powell

(57) ABSTRACT

Apparatus for harvesting the feet from poultry foot and leg parts including positioning means for positioning the a known feature of the foot and leg part at a prescribed location and severing means for severing the leg of the foot and leg part at a prescribed distance from said prescribed location to recover the foot.

14 Claims, 10 Drawing Sheets

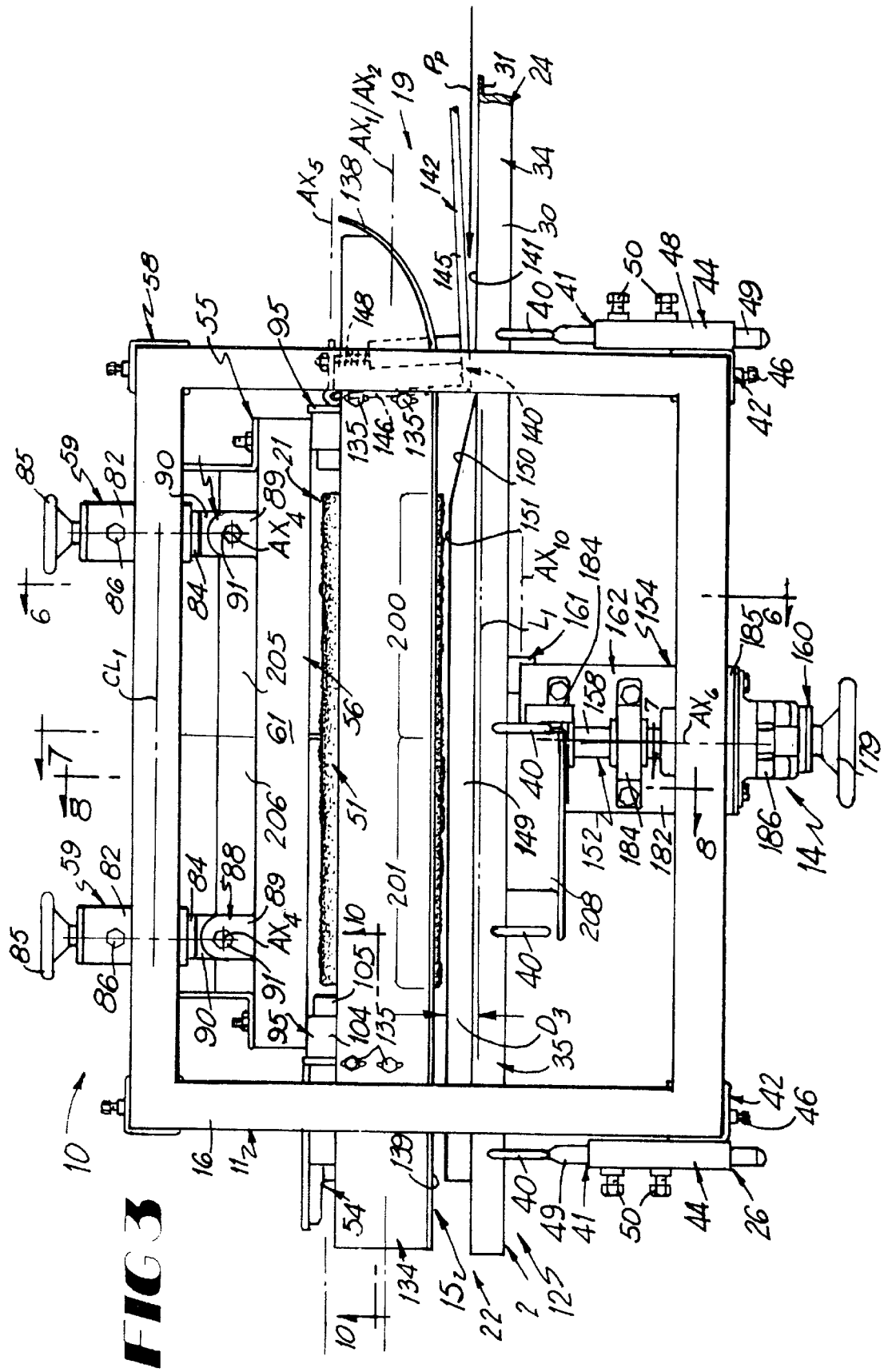

POULTRY FOOT HARVESTER AND METHOD

BACKGROUND OF THE INVENTION

This invention relates generally to poultry processing and more particularly to the processing of a poultry foot and leg part to recover the foot.

Poultry is suspended by its legs in a head lowermost position from shackles moved sequentially through the poultry processing plant on the overhead conveyor for killing, scalding, and picking. After the feathers have been picked from the carcass, the legs and feet are separated from the rest of the carcass by separating the hock joint. The leg and foot part remains captivated in the shackles on the overhead conveyor after the hock joint separation and is eventually unloaded from the shackle. Because poultry feet are edible and the demand is high, especially in the Oriental food market, it is desirable to recover the poultry feet from the foot and leg part and skin the separated feet to render them edible. The resulting edible product is sold on a weight basis so it is important to accurately locate the point at which the leg is severed to recover the foot in order to maximize the economic return from the recovered feet. The preferred position at which the leg is severed is about $3/8$ inch above the spur on the leg.

One prior art technique used to recover the edible portions of poultry feet is to cut the feet from the legs while the foot and leg parts are still carried in the shackles on the overhead conveyor and then batch process the feet to skin them. This technique is unable to accurately locate the point at which the legs are severed. While the shackles are located relative the cutting knife or saw, the position on the leg at which the shackle engages the leg varies widely once the hock cut has been made to separate the remainder of the carcass from the foot and leg parts. Moreover, the remaining portions of the leg had to be separately removed from the shackle.

Another prior art technique used to recover the edible portions of the poultry feet is disclosed in U.S. Pat. No. 4,102,015. This patent discloses a three section piece of equipment; a blanching station, a skinning station, and a severing station through which the foot and leg parts are transported in the picking shackle on the overhead conveyor. The foot and leg parts are first immersed in hot water in the blanching station to heat the skin on the feet and legs to loosen it, then passed through the skinning station where the fingers on skinning rollers remove the skin from the feet and legs, and finally the skinned feet and legs are moved through the severing station where the feet are severed from the legs. Like the prior art technique described above, the remaining portions of the leg are still retained in the shackles and have to be subsequently separately removed.

These prior art techniques are thus not able to accurately locate the position at which the leg is severed to separate the feet resulting in loss of recovery in the weight of the edible product. Moreover, multiple pieces of equipment or multiple stations in the equipment are required to carry out the processing of the foot and leg parts to recover the edible feet thereby keeping the cost of processing high. As a result, poultry processors have had difficulty in economically maintaining a processing operation for poultry feet.

SUMMARY OF THE INVENTION

These and other problems and disadvantages associated with the prior art are overcome by the invention disclosed herein by providing apparatus for and method of processing poultry feet which are able to accurately locate the position at which the poultry leg is severed to separate the feet so as to maximize the recovered weight of the processed feet and which utilizes the minimum amount of equipment to perform the processing operation. All of the processing operations are integrated in a single piece of equipment so as to minimize the cost thereof. As a result, the processing cost is minimized while the recovered weight of the feet is maximized.

The poultry foot harvesting apparatus of the invention includes foot positioning means for selectively positioning a known feature on the poultry foot and leg part at a first prescribed location; and foot cutoff means for severing the leg a prescribed distance from said first prescribed location to recover the foot. The foot positioning means may comprise knuckle locating means for engaging the poultry leg at the hock knuckle so as to locate the hock knuckle at the first prescribed location, and foot engaging means for engaging and forcing the poultry foot away from the knuckle locating means to hold the knuckle in the first prescribed location. The knuckle locating means may include a pair of spaced apart guide bars defining a prescribed space therebetween which is larger than the poultry leg between the knuckle and foot but smaller than the knuckle so that the knuckle will engage the guide bars when the knuckle is forced toward the guide bars to locate the knuckle in the first prescribed location. The foot engaging means may include a pair of brush assemblies constructed and arranged to engage the feet of the poultry while the legs are engaged by the knuckle locating means; and means for rotating the brush assemblies to force the poultry feet away from the knuckle locating means and maintain the hock knuckle in the first prescribed position. Each of the brush assemblies may include a central support and a plurality of plastic bristle filaments mounted on the central support and projecting radially outwardly therefrom with the plastic bristle filaments constructed and arranged to remove the skin from the poultry feet as an incidence of forcing the feet away from the knuckle locating means. The plastic bristle filaments may be constructed and arranged to urge the poultry feet tangentially about the brush assemblies and axially along the brush assemblies. The invention may also include adjustment means for movably positioning the foot cutoff means relative to the foot positioning means to selectively change the prescribed distance from the first prescribed location that the poultry leg is severed. The foot cutoff means may include a circular knife member defining a cutting edge therearound, means for rotating the knife, and backup means for supporting the leg in opposition to the circular knife so that the leg is forced into contact with the circular knife to sever the leg. The backup means may include an elongate backup member defining a backup surface thereon to engage the poultry leg in opposition to the knife member where the backup member defines at least one knife receiving recess therein into which a portion of the cutting edge of the knife projects to insure that the knife completely severs the poultry leg.

The apparatus of the invention may be used in conjunction with an overhead conveyor including shackles for transporting the poultry feet and leg parts along a prescribed processing path and may further include shackle guide means for guiding the shackles with the poultry feet and leg parts therein past the foot positioning means and the foot cutoff means so that the foot positioning means positions the poultry feet and leg parts independently of the shackles as the shackles move the poultry feet and leg parts past the foot positioning means and the shackles are displaced out of interference with the foot cutoff means as the shackles move the poultry feet and leg parts past the foot cutoff means.

The poultry foot harvesting apparatus of the invention may be used to remove the feet from poultry foot and leg parts carried in shackles by an overhead conveyor and comprise means for exerting a force on each poultry foot and leg part carried by the shackles so as to force the hock knuckle on the leg toward the shackle; and means for severing the leg between the shackle and hock knuckle so that the foot and leg part is inherently unloaded from the shackle when the leg is severed. The means for exerting a force on each poultry foot and leg part may further be constructed and arranged to remove the skin from the poultry foot and leg part while exerting the force on the poultry foot and leg part.

The apparatus of the invention is also directed to a poultry processing brush assembly comprising a elongate cylindrical core member; and an elongate continuous brush strip spirally wrapped around said cylindrical core member so as to urge poultry parts held against said brush strip axially along the brush assembly. The brush strip may include a base channel mounting a plurality of resilient filaments therein that are held in place by a tie down wire.

The method of the invention is directed to harvesting the feet from the legs of poultry comprising the steps of locating the hock knuckle on the poultry leg at a known location; and, while the leg is so held, severing the leg a prescribed distance from the known location to separate the foot from the poultry leg. The method of the invention may further comprise the step of conveying each foot and leg along a prescribed conveying path while the hock knuckle is located and while the leg is severed.

These and other features and advantages of the invention will become more clearly understood upon consideration of the following detailed description and accompanying drawings wherein like characters of reference designate corresponding parts throughout the several views and in which:

BRIEF DESCRIPTION OF THE DRAWINGS

FIG. 3 is an enlarged top view of the invention seen in FIG. 1;

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
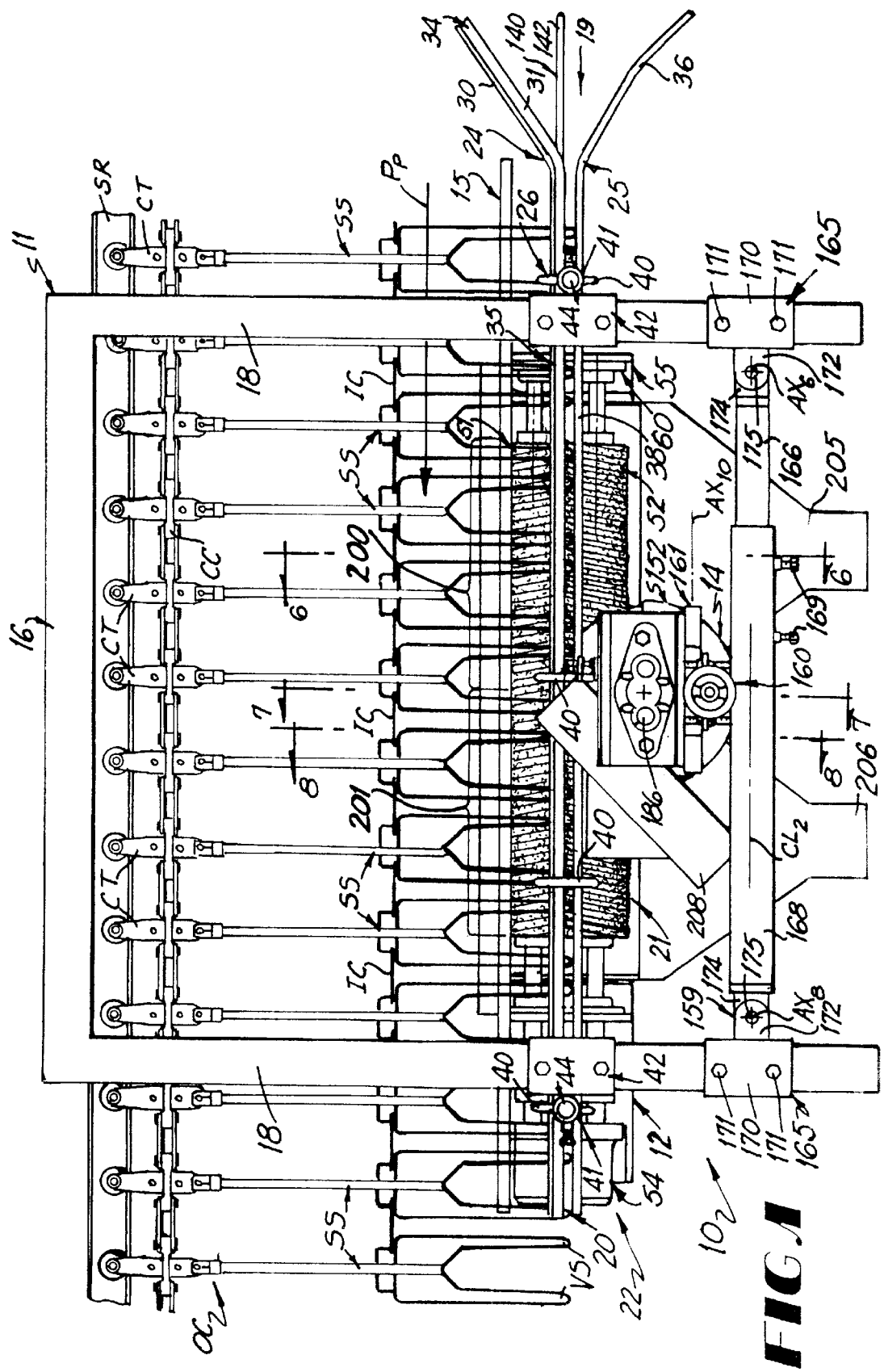
FIG. 1 is a side elevational view of the invention installed on an overhead conveyor in a poultry processing plant.
Figure 4:
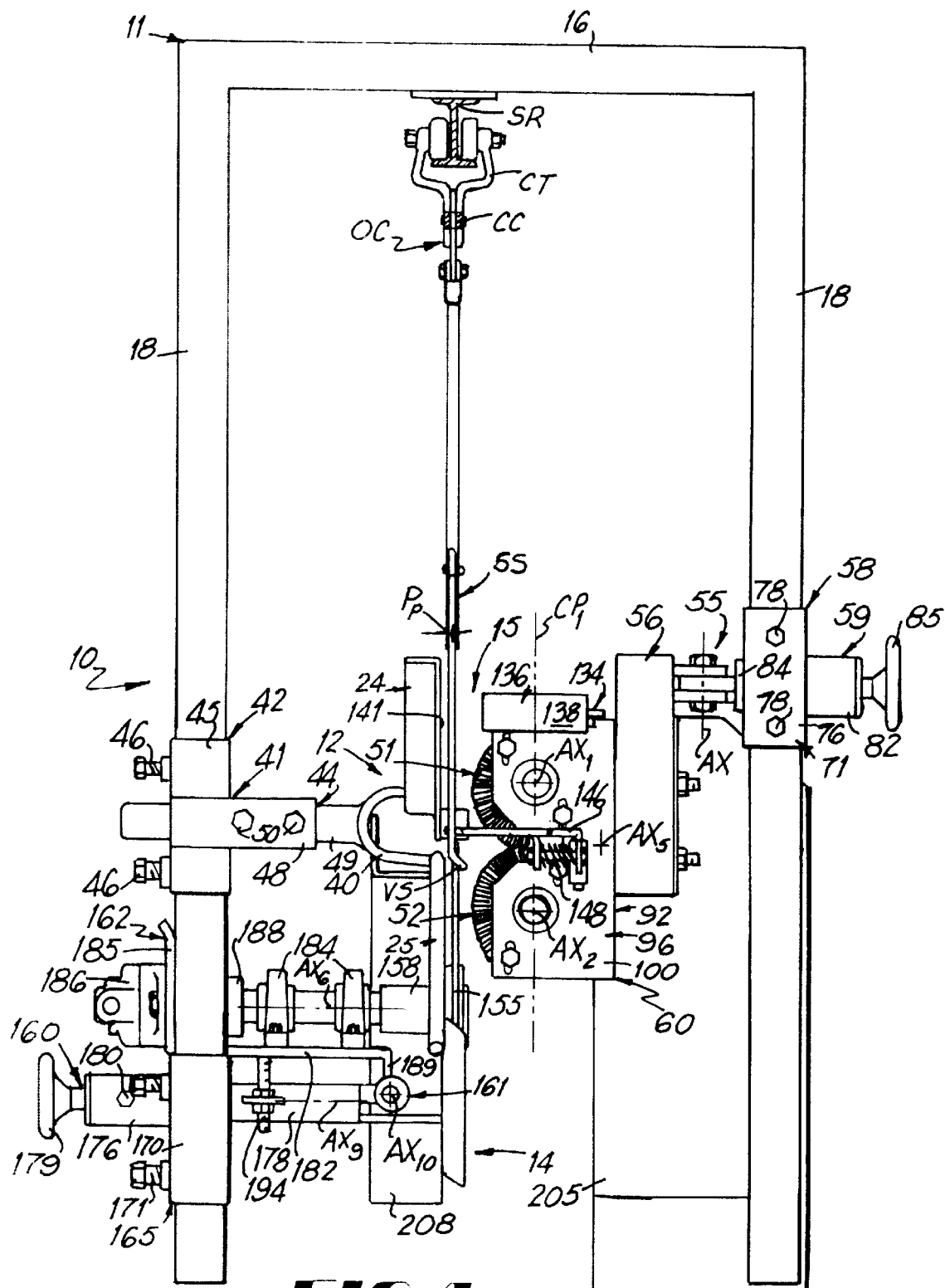
FIG. 4 is an enlarged entrance end view of the invention seen in FIG. 1.
Figure 5:
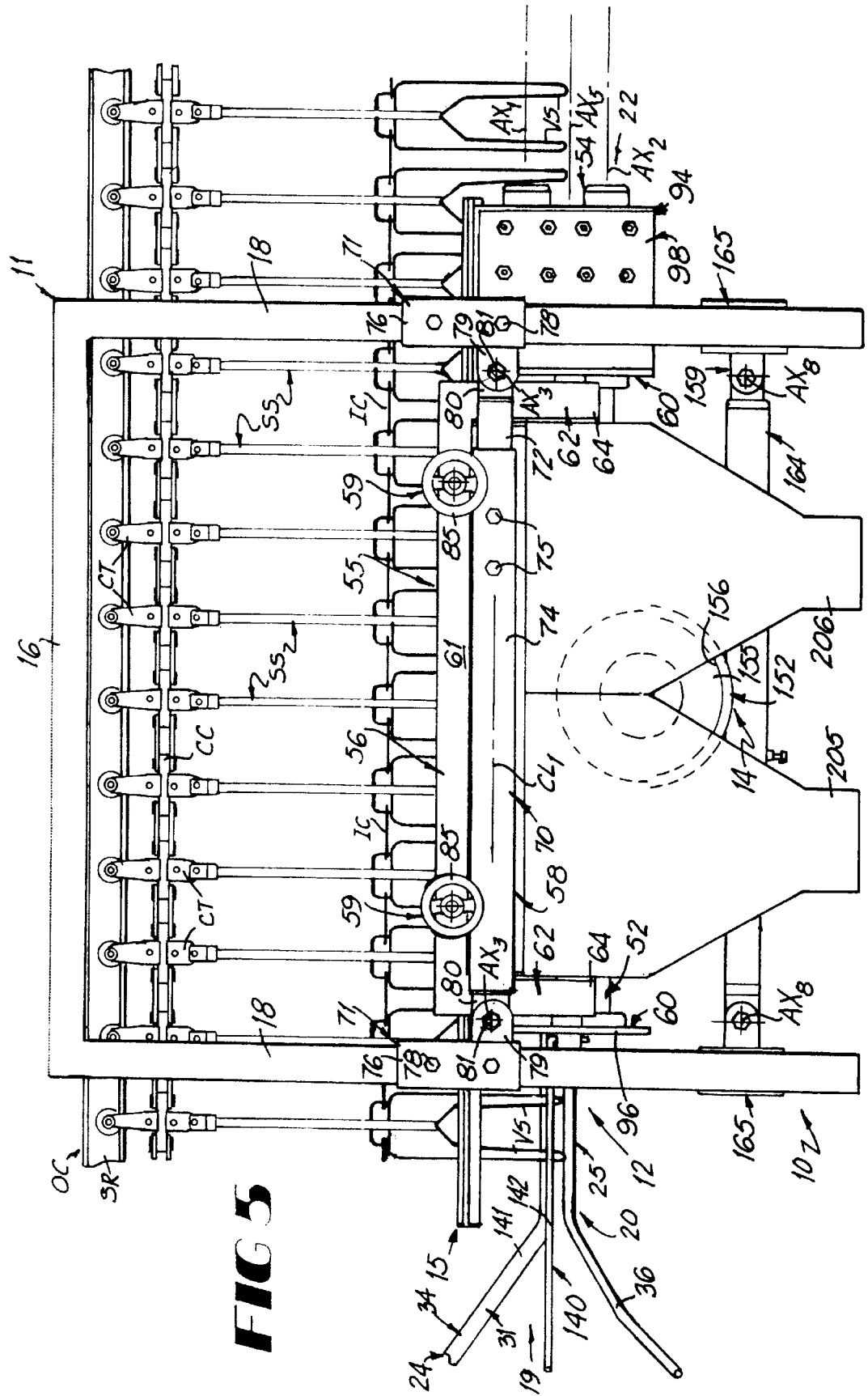
FIG. 5 is a rear elevational view of the invention seen in FIG. 1.

Referring to FIGS. 1, 4, and 5, it will be seen that the foot harvesting apparatus 10 is used in conjunction with the overhead conveyor OC in a poultry processing plant. The overhead conveyor OC includes an overhead support rail SR which supports a plurality of conveyor trolleys CT thereon interconnected by the conveyor chain CC in conventional fashion. A plurality of support shackles SS are suspended from the trolleys CT and conveyor chain CC. The birds are conventionally supported by their legs in the shackles SS in a head lowermost position for processing. After the birds have been scalded and picked, their legs are separated at the hock to release the body of the bird from the foot and leg part FLP (FIG. 2) leaving the foot and leg parts still carried in the shackles SS. The foot harvesting apparatus 10 is positioned in the processing path Pp after the hock has been separated to process the feet into an edible product and unload the foot and leg part FLP from the shackle SS as the shackles SS move from the entrance end 19 of the apparatus 10 to its exit end 22.

Figure 2:
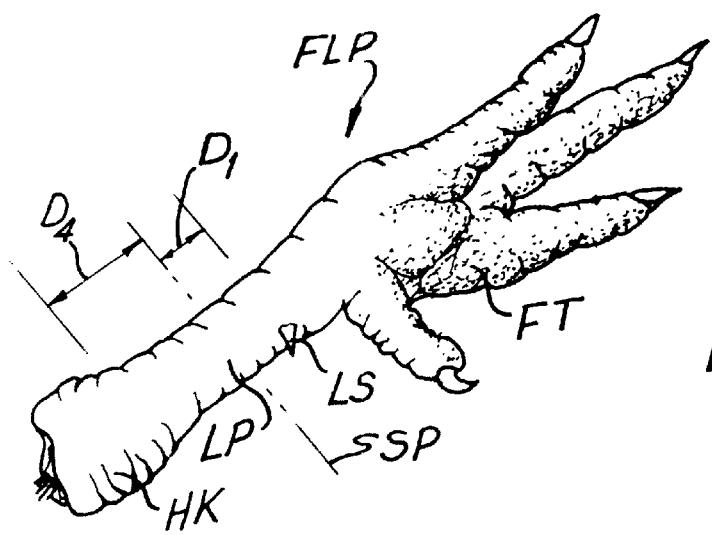
FIG. 2 is a view showing the poultry foot and leg part that is to be processed.

As best seen in FIG. 2, the foot and leg part FLP has a leg portion LP with the enlarged hock knuckle HK at one end and the foot FT at the other end. The leg spur LS is located on the leg portion LP intermediate the foot and the hock knuckle. Customer specifications require that the leg portion LP be severed at a prescribed position to recover the foot FT. While this position may vary by customer, the severing position SP is typically specified as a prescribed distance $D_1$ from the leg spur LS and is commonly about ⅜ inch (9.5 mm). Because the distance between the hock knuckle HK and the leg spur LS remains about the same throughout a single house flock and because the leg spur LS is not easily detected mechanically, the hock knuckle HK can be used as a reference point to locate the severing position SP on the leg portion LP on the foot and leg part FLP as will become more apparent.

Referring again to FIGS. 1, 3 and 4, the foot harvesting apparatus 10 includes a support frame 11 usually supported from the overhead support rail SR of the overhead conveyor OC. A foot positioning arrangement 12 is mounted on the support frame 11 for locating a known feature on the foot and leg parts FLP carried by the shackles SS at a prescribed first location, and a foot cutoff arrangement 14 is mounted on the support frame 11 for severing the leg of the foot and leg part FLP a prescribed distance from the known feature located at the first prescribed location by the foot positioning arrangement 12. The foot cutoff arrangement 14 severs the leg of the foot and leg part FLP so that the hock knuckle HK preventing the leg from being pulled out of the shackle SS is removed whereby the foot positioning means 12 further removes the severed foot portion of the foot and leg part FLP from the shackle SS to unload it. Additionally, the foot positioning arrangement 12 serves to remove the skin from the foot and leg part FLP as an incident to the positioning of the known feature on the foot and leg part FLP at the first prescribed location. Also, the foot cutoff arrangement 14 is adjustably positionable with respect to the foot positioning arrangement 12 so as to adjustably vary the distance from the first prescribed location that the leg is severed. A shackle guide arrangement 15 is also provided to guide the shackles SS through the apparatus 10 so that the shackles force the foot and leg parts FLP axially along the processing path $P_P$ past the foot positioning arrangement 12 which positions the foot and leg parts laterally with respect to the processing path $P_P$ and past the foot cutoff arrangement 14 to sever the foot FT from the leg portion LP as will become more apparent.

As best seen in FIGS. 1, 4, and 5, the overhead conveyor OC is of conventional construction. The shackles SS are picking shackles provided with a pair of open top V-shaped sections VS, each of which is sized to receive that portion of the leg of a bird between the hock and the foot. Usually a convenient interconnection IC connects the shackles SS to force them along the processing path $P_P$. The weight of the bird keeps the leg wedged in the lower portion of the section VS so that the legs of the bird are retained in the sections VS to support the bird in a head lowermost position for stunning, killing, scalding and picking as is conventional in the poultry processing plant. The hock joint in the leg is conventionally severed with a hock cutter to separate the body of the bird for further processing leaving the foot and leg part FLP still carried in the V-sections VS of the shackles SS. After the hock joint is separated, the enlarged hock knuckle HK on one end of the leg portion LP of the foot and leg part FLP and the foot FT on the opposite end of the leg portion LP keep the foot and leg part FLP in the V-sections of the shackles.

The support frame 11 best seen in FIGS. 1 and 3–5 includes a top framework 16 mounted on the overhead conveyor support rail SR. Four vertical posts 18 are attached to and depend below the top framework 16 with two of the posts 18 located on one side of the shackles SS moving along the support rail SR and two posts 18 located on the opposite side of the shackles SS. The foot positioning arrangement 12, the foot cutoff arrangement 14 and the shackle guide arrangement 15 are mounted on the vertical posts 18.

Figure 6:
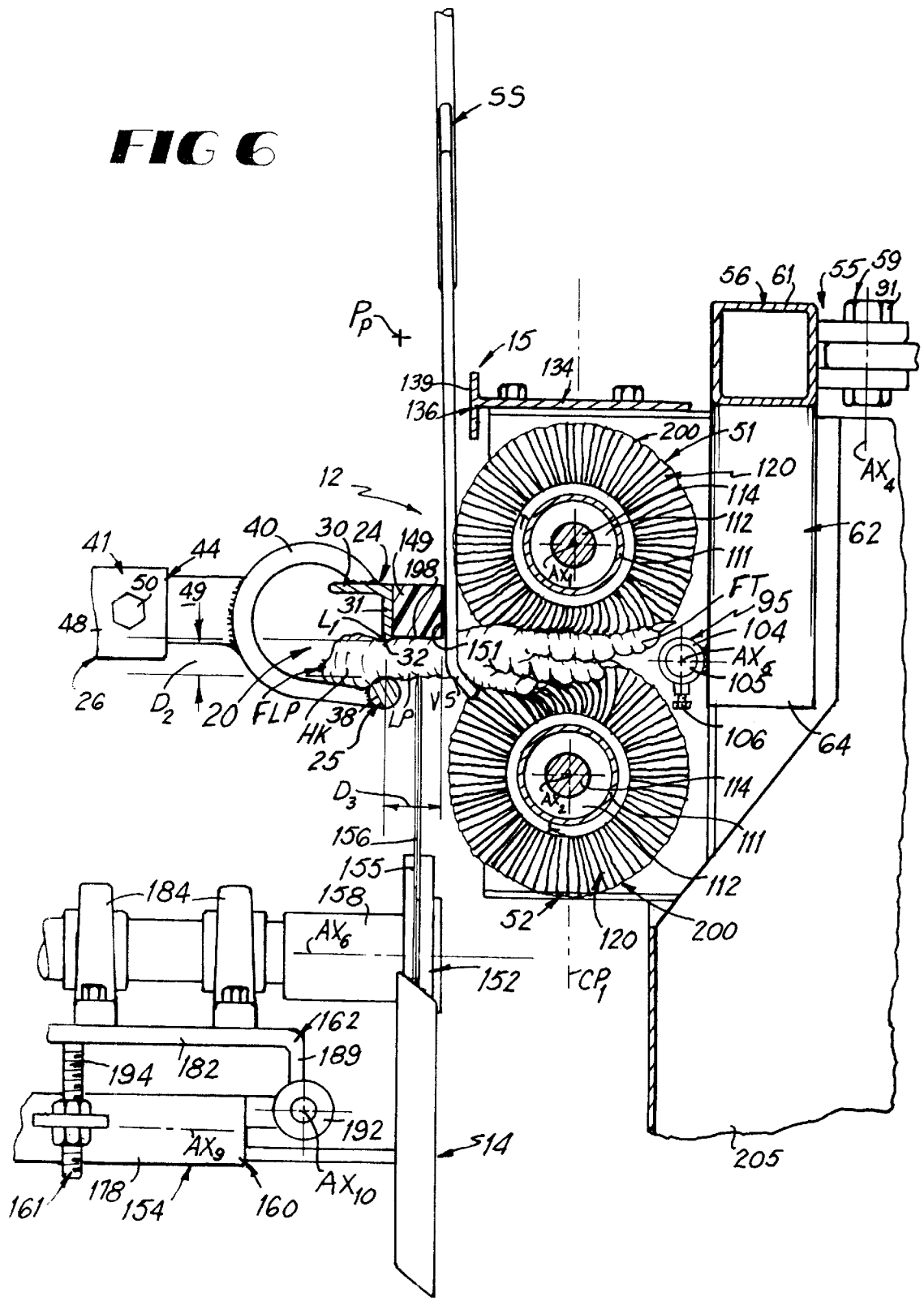
FIG. 6 is an enlarged cross-sectional view taken generally along line 6—6 in FIGS. 1 and 3 showing the foot and leg part being positioned for processing and skin removal.

The foot positioning arrangement 12 best seen in FIGS. 1, 3, 4, and 6–8 includes a knuckle locating assembly 20 that arrests the movement of the foot and leg part FLP therethrough at the hock knuckle HK as will become more apparent, and a foot engaging arrangement 21 that frictionally engages the feet FT on the foot and leg parts FLP to force the hock knuckle HK against the knuckle locating assembly 20 to locate the hock knuckle at the first prescribed location $L_1$ best seen in FIG. 6. The foot engaging arrangement 21 also serves to remove the skin from the foot and leg part FLP as the knuckle HK is pulled into the location $L_1$ if the foot and leg part FLP has been scalded sufficiently prior to reaching the apparatus 10 to keep the skin loosened. This may be accomplished while the complete bird is being scalded prior to picking or in a subsequent scalding operation after the hock has been cut.

The knuckle locating assembly 20 best seen in FIGS. 1 and 6 includes an elongate upper knuckle guide member 24 and a elongate lower knuckle guide member 25. A knuckle guide mounting arrangement 26 positions the guide members 24 and 25 so that they extend through the apparatus 10 generally parallel to each other. The foot and leg part FLP is moved through the apparatus 10 so that the leg portion LP of the part FLP between the shackle SS and the hock knuckle HK passes between the guide members 24 and 25 while the members 24 and 25 prevent the hock knuckle HK from passing therebetween to thusly locate the hock knuckle laterally of the processing path $P_P$.

The upper guide member 24 as seen in FIG. 6 has an inverted L-shaped cross-section with an upper generally horizontally extending flange 30 and a depending flange 31 integral with one edge of the upper flange 30. The depending edge 32 on the flange 31 serves as an abutment to engage the hock knuckle HK of each foot and leg part FLP as the leg portion LP thereof is moved along the length of members 24 and 25. The upper guide member 24 has an upwardly angled infeed section 34 on the upstream end thereof as seen in FIG. 1 facing the oncoming foot and leg parts FLP in the shackles SS and an elongate straight locating section 35 extending through the apparatus 10 to locate the hock knuckle HK as it passes through the apparatus.

The lower guide member 25 has a circular cross-section with a downwardly angled infeed section 36 as seen in FIG. 1 at the upstream end thereof facing the oncoming foot and leg parts FLP in the shackles SS and an elongate straight backup section 38 extending through the apparatus 10 to keep the leg portion LP up against the locating edge 32 on the depending flange 31 on the upper guide member 30.

The backup section 38 of the lower guide member 25 is spaced a prescribed distance $D_2$ below the locating edge 32 on the upper guide member 30 selected to be larger than the cross-sectional dimension of the leg portion LP of the foot and leg part FLP and smaller than the cross-sectional dimension of the hock knuckle HK. This insures that the hock knuckle HK can be pulled up against the depending locating edge 32 on the upper guide member 24 to locate it at the locating edge 32 which serves as the first prescribed location $L_1$ laterally of the processing path $P_P$. The location $L_1$ extends along the length of the locating edge 32 past the foot cutoff arrangement 14. Thus, location $L_1$ is actually a line that is vertically and horizontally fixed so that the location on the leg portion LP of the foot and leg part FLP where the severing cut is made can be accurately determined as will become more apparent. It will be appreciated that the shackles SS propel the foot and leg part FLP along the length of the guides 24 and 25 as the conveyor chain CC sequentially moves the shackles SS.

The knuckle guide mounting arrangement 26 includes a plurality of C-shaped guide supports 40 seen in FIGS. 1, 3, 4, and 6–8 connecting the upper and lower guide members 24 and 25 at spaced apart positions along the length thereof so as to maintain the spacing therebetween. The opening through the C-shaped guide supports 40 provide clearance for the hock knuckles HK projecting out the side of the members 24 and 25 to pass along the length of the members 24 and 25.

The knuckle guide mounting arrangement 26 also includes a pair of knuckle guide mounting assemblies 41 that adjustably mount the upper and lower knuckle guide members 24 and 25 on the posts 18 on the near side of the shackles SS as seen in FIG. 1. Each of the knuckle guide mounting assemblies 41 connects one of the C-shaped guide supports 40 to one of the posts 18, and includes a height adjustment mechanism 42 for adjusting the vertical height of the guide members 24 and 25 relative to the shackles SS and a lateral adjustment mechanism 44 for adjusting the lateral spacing of the guide members 24 and 25 relative to the shackles SS. Each height adjustment mechanism 42 seen in FIGS. 3 and 4 includes a vertical slide tube 45 slidably mounted on the post 18. Height adjustment locking fasteners 46 extend through slide tube 45 to selectively fix the slide tube 45 vertically along the post 18. Each lateral adjustment mechanism 44 seen in FIGS. 3 and 4 includes a lateral support tube 48 fixedly attached to the vertical slide tube 45 and oriented generally horizontal with its central axis generally normal to processing path $P_P$ when viewed as in FIG. 4. A lateral slide member 49 is slidably received in the lateral support tube 48 and projects therefrom toward the shackles SS. One of the C-shaped guide supports 40 is affixed to the projecting end of the lateral slide member 49. Lateral locking fasteners 50 selectively fix the slide member 49 with respect to the lateral support tube 48. Thus, it will be seen that the upper and lower guide members 24 and 25 can be vertically and laterally positioned with respect to the shackles SS and therefore with respect to the foot and leg parts FLP carried in the shackles SS.

The guide members 24 and 25 are positioned so that the leg portions LP of the foot and leg parts FLP pass between the infeed sections 34 and 36 of the upper and lower guide members 24 and 25 respectively with the hock knuckles HK located on that side of the guide members 24 and 25 opposite the processing path $P_P$. As the shackles SS continue to move along the processing path $P_P$, the leg portions LP of the foot and leg parts FLP are captivated between the locating edge 32 on the straight locating section 35 of the upper guide member 24 and the straight backup section 38 of the lower guide member 25 as seen in FIG. 6.

Figure 10:
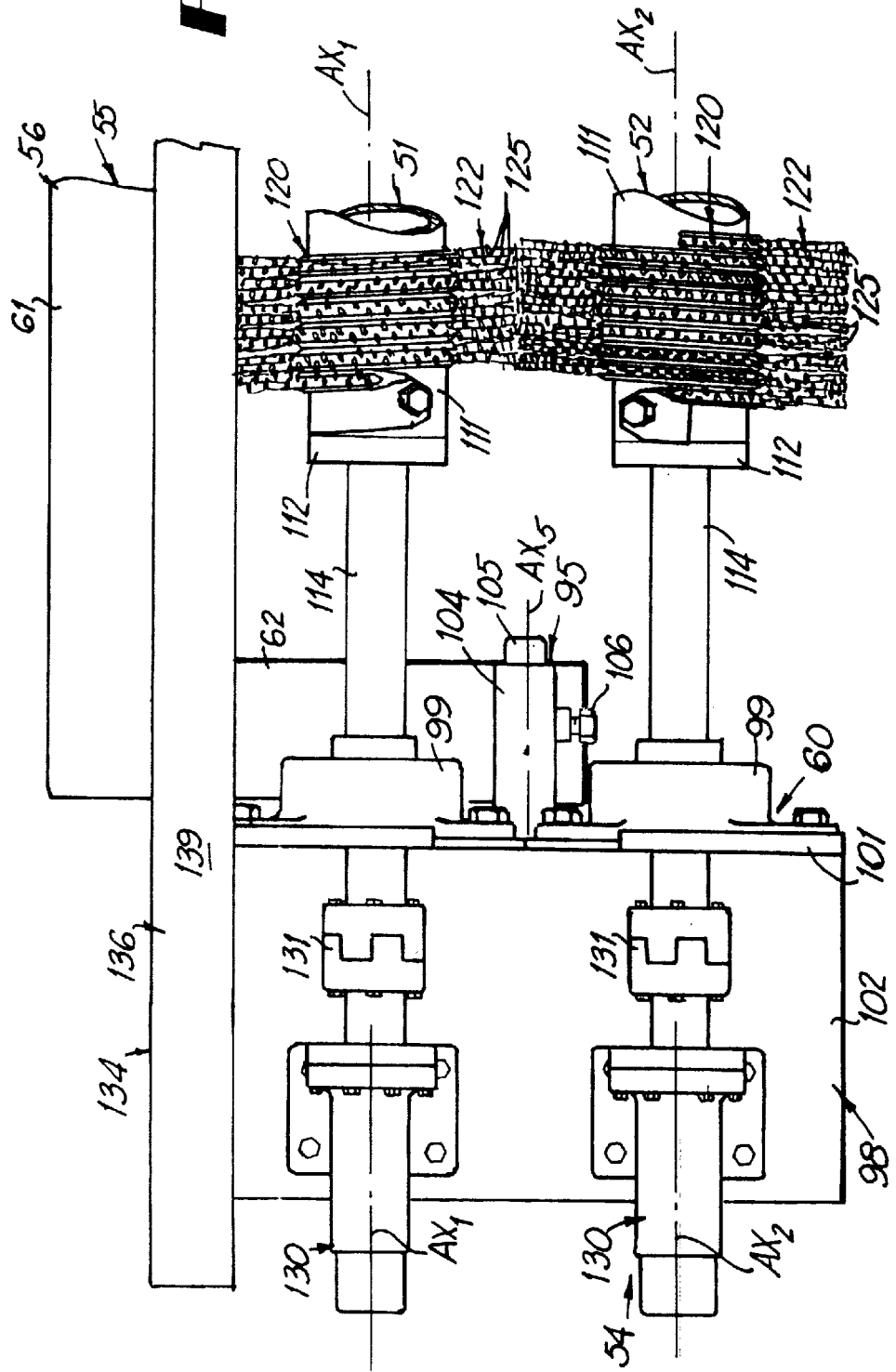
FIG. 10 is an enlarged view taken generally along line 10—10 in FIG. 3 showing the pivotal mounting of the brush assemblies; and, FIG. 11 is an enlarged longitudinal view of a portion of one of the brush assemblies showing the construction thereof.

The foot engaging arrangement 21 best seen in FIGS. 1, 4, 6–8, and 10 includes an upper brush assembly 51, a lower brush assembly 52, a brush driving arrangement 54 for rotating the brush assemblies 51 and 52, and a brush mounting arrangement 55 for mounting the brush assemblies 51 and 52 so as to engage the feet FT of the foot and leg parts FLP carried by the shackles SS. The brush mounting arrangement 55 includes a brush support frame 56 seen in FIGS. 3–6 mounted between the posts 18 on the far side of the processing path $P_P$ by a height adjustment arrangement 58 best seen in FIGS. 4 and 5 and a lateral adjustment arrangement 59 seen in FIGS. 3–5. An end bearing arrangement 60 seen in FIGS. 1 and 10 is pivotally mounted on the support frame 56 about a common pivot axis $AX_5$.

The brush support frame 56 best seen in FIGS. 5, 6, and 10 includes an upper central tube 61 with a pair of end tubes 62 depending from opposite ends of the central tube 62. As will become more apparent, the central tube 61 is mounted on the lateral adjustment arrangement 59 and the bearing arrangement 60 is pivotally mounted between the depending ends 64 of the end tubes 62 about the pivot axis $AX_5$.

The height adjustment arrangement 58 includes a rear side frame tube assembly 70 mounted between the posts 18 on the far side of the shackles SS as seen in FIGS. 4 and 5 by a pair of end height adjustment mechanisms 71. The tube assembly 70 includes an inside tube 72 slidable mounted in an outside tube 74 so that the length of the tube assembly 70 can be adjusted to match the distance between the posts 18 as will become apparent. Tube locking fasteners 75 are provided to selectively fix the tubes 72 and 74 with respect to each other.

Each of the end height adjustment mechanisms 71 best seen in FIG. 5 includes a tubular slide member 76 slidably mounted on the associated post 18 with height adjustment locking fasteners 78 to selectively fix the slide member 76 vertically along the post 18. A pair of post side pivot ears 79 are provided on the slide member 76 that are pinned to the tube end pivot ear 80 on the end of the tube assembly 70 by pivot pin 81 so that the tube assembly 70 can pivot with respect to the end height adjustment mechanism 71 about the horizontal axis $AX_3$ of the pivot pin 81. This allows the height of opposite ends of the tube assembly 70 to be adjusted independently of each other so that both the overall height of the tube assembly 70 and the attitude of the tube assembly 70 with respect to the horizontal are adjustable.

Each lateral adjustment mechanism 59 best seen in FIGS. 3 and 4 includes a generally horizontally extending lateral support tube 82 affixed to the outside tube 74 of the tube assembly 70 and oriented normal to the centerline $CL_1$ of tube assembly 70 and the processing path $P_P$ along which the shackles SS are moving. A lateral slide member 84 is slidably mounted in the tube 82 for movement toward and away from the poultry processing path $P_P$ by a lateral adjustment screw and wheel unit 85. Lateral locking fasteners 86 seen in FIG. 3 are provided to selectively fix the position of the slide member 84 with respect to the lateral support tube 82.

The projecting end of each of the lateral slide members 84 is connected to that side (the off side) of the upper central tube 61 of the brush support frame 56 opposite the processing path $P_P$ through a pivot assembly 88 seen in FIGS. 3 and 4. The pivot assembly 88 includes a pair of frame side pivot ears 89 mounted on the off side of the brush support frame 56 that are pivotally connected to a slide side pivot ear 90 mounted on the projecting end of the slide member 84 via pivot pin 91 so that the brush support frame 56 can pivot with respect to the lateral adjustment mechanism 59 about the vertical axis $AX_3$ of the pivot pin 91. This allows the horizontal spacing and attitude of the brush support frame 56 relative to the processing path $P_P$ and the guide members 24 and 25 to be adjusted while the frame 56 remains in a vertical plane as viewed in FIG. 4.

Figure 7:
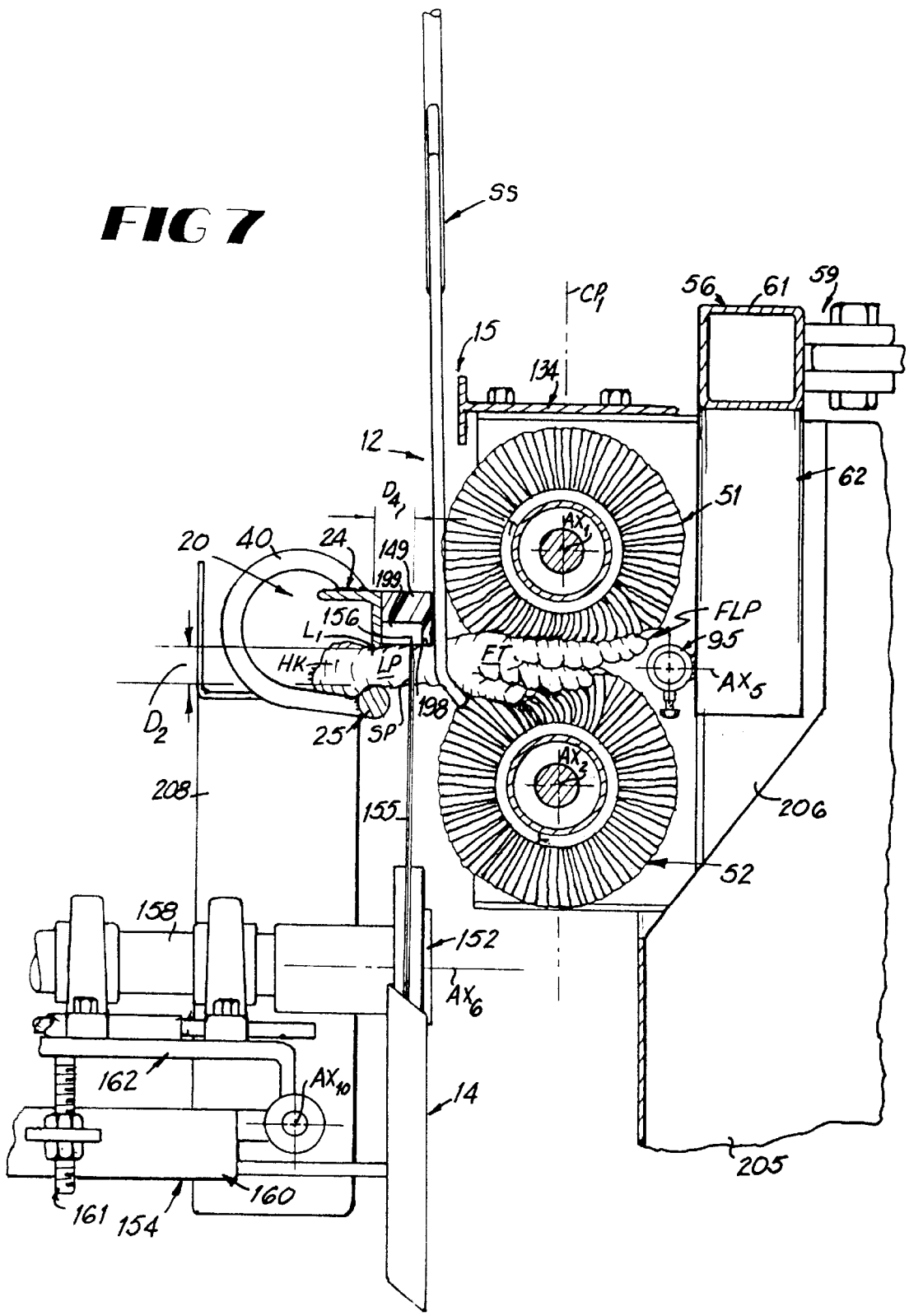
FIG. 7 is an enlarged cross-sectional view taken generally along line 7—7 in FIGS. 1 and 3 showing the foot being severed from the foot and leg part.

The end bearing arrangement 60 best seen in FIGS. 4 and 10 rotatably mounts the upper and lower brush assemblies 51 and 52 between a non-driven mounting assembly 92 best seen in FIG. 4 and a driven end mounting assembly 94 best seen in FIG. 10. The mounting assemblies 92 and 94 are pivotally mounted on the depending ends 64 of the end tubes 62 of the support frame 56 as best seen in FIGS. 6, 7, and 10 by pivot connections 95 about pivot axis $AX_5$.

The mounting assembly 92 includes a mounting plate 96 seen in FIG. 4 while the mounting assembly 94 includes a mounting plate 98 seen in FIGS. 6–8 and 10, and both of the mounting assemblies 92 and 94 include upper and lower shaft bearings 99 best seen in FIG. 10 mounted on the plates 96 and 98 that rotatably mount the brush assemblies 51 and 51 therein.

The non-driven end mounting plate 96 includes a generally vertically extending bearing mounting section 100 seen in FIG. 4 normal to the vertical plane of the processing path $P_P$. The section 100 adjustably mounts the upper and lower shaft bearings 99 thereon to rotatably mount the non-driven ends of the brush assemblies 51 and 52.

The driven end mounting plate 98 seen in FIG. 10 also includes a generally vertically extending bearing mounting section 101 normal to the vertical plane of the processing path $P_P$ and adjustably mounts another set of upper and lower shaft bearings 99 thereon to rotatably mount the driven ends of the brush assemblies 51 and 52. The bearings 99 on the opposite ends of the brush assemblies 51 and 52 position the brush assemblies so that the respective rotational axes $AX_1$ and $AX_2$ thereof are parallel and aligned along a common plane $CP_1$ as best seen in FIGS. 6 and 7.

The driven end mounting plate 98 also includes a general vertically extending drive mounting section 102 seen in FIG. 10 oriented normal to the bearing mounting section 101. The mounting section 102 mounts the brush driving arrangement 54 thereon for rotating the brush assemblies 51 and 52.

Figure 8:
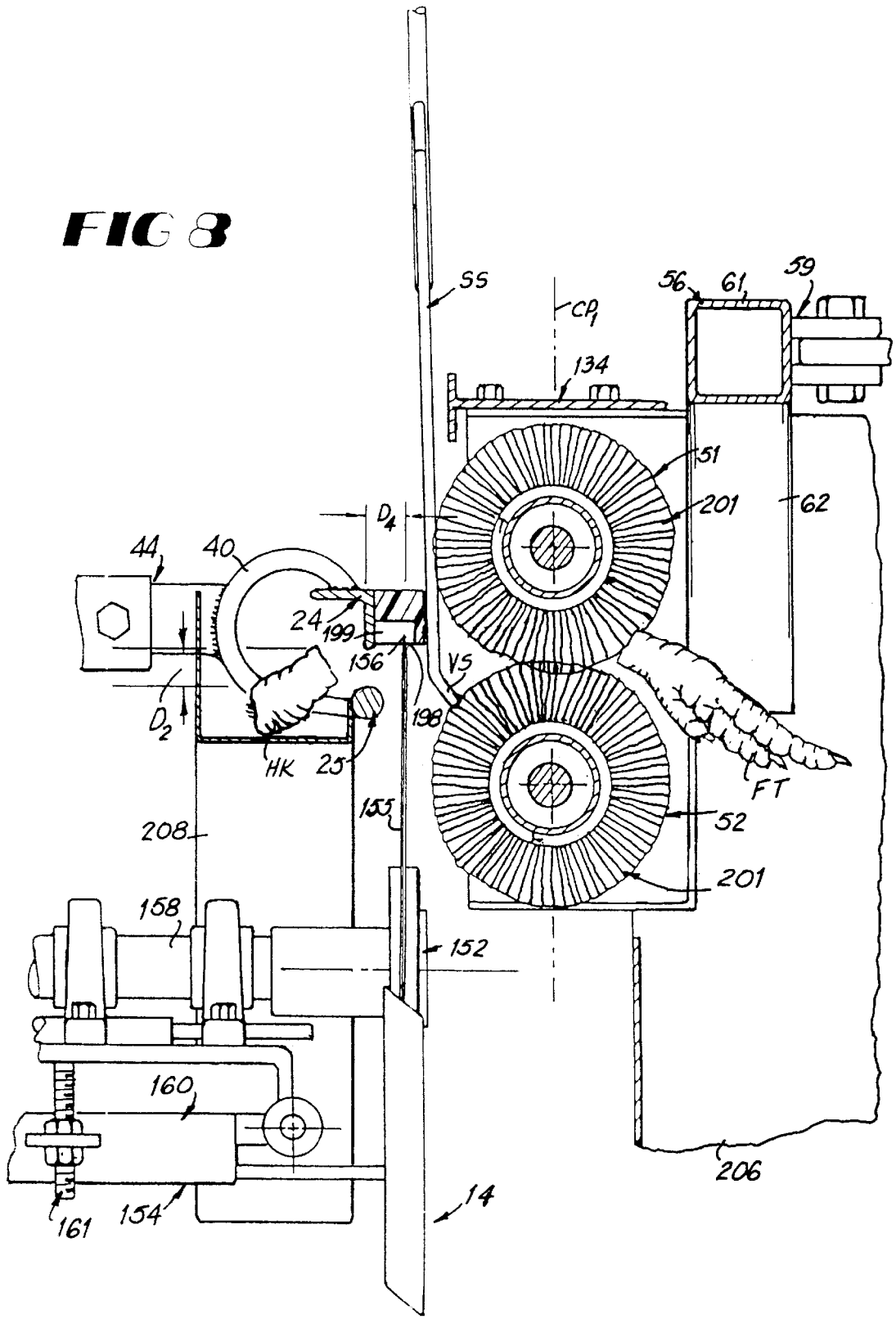
FIG. 8 is an enlarged cross-sectional view taken generally along line 8—8 in FIGS. 1 and 3 showing the shackle being unloaded.

The pivot connections 95 best seen in FIGS. 6–8 and 10 pivotally connecting the mounting assemblies 92 and 94 to the brush support frame 56 each includes a pivot support tube 104 mounted on the depending end 64 of each of the end tubes 62 of the frame 56 and a pivot stub shaft 105 affixed to the inside of the mounting assembly 92 or 94. The pivot support tubes 104 are aligned along a common pivot axis $AX_6$ so that the stub shafts 105 and thus the mounting assemblies 92 and 94 pivot about this axis. The stub shafts 105 are affixed respectively to the inside of the mounting sections 100 and 101 on the mounting plates 96 and 98 equidistant from the axes $AX_1$ and $AX_2$ of the bearings 99 and spaced laterally of the common plane $CP_1$ of the axes $AX_1$ and $AX_2$ as best seen in FIGS. 6–8. This allows the attitude of the common plane $CP_1$ to be adjusted with respect to the vertical. An appropriate locking fastener 106 seen in FIG. 10 is provided on each support tube 104 to selectively fix the rotational position of the stub shaft 105 in the support tube 104.

Both the upper and lower brush assemblies 51 and 52 have the same construction. Each brush assembly 51 or 52 as seen in FIGS. 6–8 and 10 includes a core tube 111 with shaft mountings 112 in opposite ends thereof. One of the shaft mountings 112 is provided with a conventional drive key (not shown) for use in drivingly connecting the core tube 111 to the mounting shaft 114 extending through the shaft mountings 112. Opposite ends of each mounting shaft 114 are rotatably mounted between the shaft bearings 99 mounted on the mounting sections 101 and 102 with the driven ends of shafts 114 extending through the bearings 99 for connection to the brush driving arrangement 54. Appropriately adjusting the position of the shaft bearings 99 on the mounting plates 101 and 102 position the brush assemblies 51 and 52 so that their axes of rotation $AX_1$ and $AX_2$ are parallel to each other. The attitude of the common plane $CP_1$ of the axes $AX_1$ and $AX_2$ is adjusted so that the feet FT will be gripped sufficiently for cleaning and to pull the hock knuckle HK up against the guide members 24 and 25 even if the shackles SS become bent during use.

A continuous brush strip 120 best seen in FIGS. 6–8, 10, and 11 is spirally wound around the core tube 111 and attached thereto at opposite ends to form the brush. The brush strip 120 includes an outwardly opening U-shaped base channel 121 best seen in FIG. 11 in which is mounted a plurality of short bristle filaments 122 of resilient plastic such as nylon. The filaments 122 held in the base channel 121 by a tie down wire 124. Each of the bristle filaments 122 is folded in its middle and captivated between the base channel 121 and the tie down wire 124. This produces a plurality of relatively stiff filament sections 125 that project generally radially outward from the core tube 111 a prescribed distance, usually about one-two inches. Good results have been achieved using nylon bristle filaments 122 with a diameter of about 0.120 inch. The brush assemblies 51 and 52 are rotated so that these filament sections 125 frictionally engage the feet FT of the foot and leg parts FLP in opposition to the upper and lower guide members 24 and 25 of the knuckle locating arrangement 20. As viewed in FIGS. 6 and 7, the upper brush assembly 51 is rotated counter-clockwise while the lower brush assembly 52 is rotated clockwise. This both pulls the hock knuckle HK on the foot and leg part FLP up against the guide members 24 and 25 to locate the knuckle HK at the first prescribed location $L_1$ and skins the foot and leg part FLP provided it has been adequately scalded to loosen the skin and remains at a sufficient temperature. Preferably, the brush strips 120 are wound around the core tube 111 so that the spiral assists in moving the foot and leg parts FLP along the length of the brush assemblies 51 and 52 from the entrance end 19 of the apparatus 10 toward its exit end 22.

Figure 11:
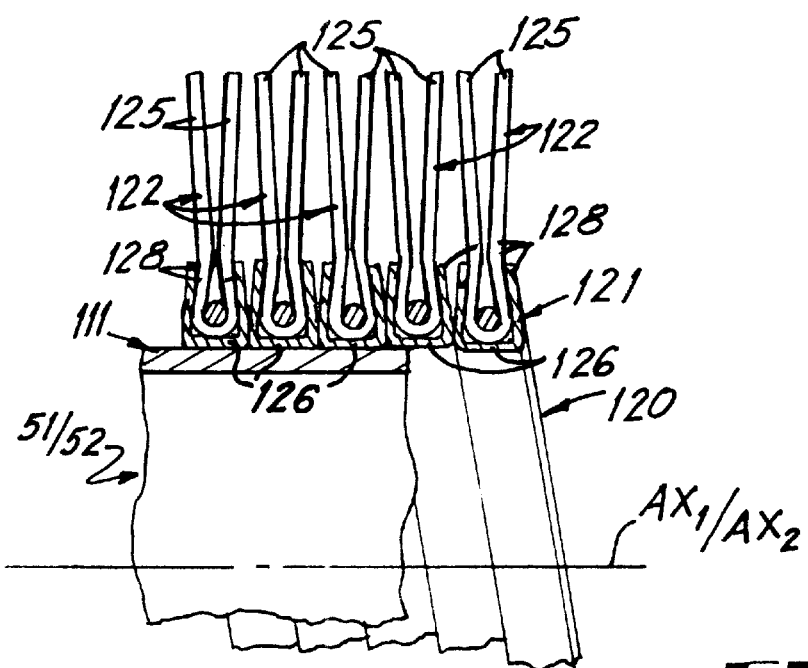

As best seen in FIG. 11, the base channel 121 has a bottom wall 126 that lies against the outside surface of the core tube 111 and a pair of outwardly projecting side flanges 128 integral with opposite sides of the bottom wall 126 and projecting outwardly therefrom. The base channel 121 is held under sufficient tension to cause the side flanges 128 to elongate as necessary to prevent buckling of the inner portions of the side flanges 128 as the base channel 121 is wrapped around the core tube 111. The tie down wire 124 is continuous and is wrapped sufficiently tightly in the base channel 121 to hold the bristle filaments 122 against the bottom wall 126. The side flanges 128 are crimped against the filaments 122 at the tie down wire 124 to also help fix the filaments 122 in place. It will be appreciated that the projecting filament sections 125 of each filament 122 flare slightly away from each other as best seen in FIG. 11 to provide further contact coverage of the skin on the foot and leg part FLP by the brush assemblies 51 and 52.

While any convenient brush driving arrangement 54 may be used, the arrangement 54 illustrated is a pair of hydraulic motors 130 best seen in FIG. 10 with the drive shaft from each drivingly connected to the end of one of the brush mounting shafts 114 through an appropriate coupling 131. This allows the rotational speed of each of the brush assemblies 51 and 52 to be independently controlled although they are usually driven at about the same speed of about 300–800 rpm.

The vertical spacing of the brush assemblies 51 and 52 are typically adjusted so that the projecting ends of the filament sections 125 on the two brush assemblies touch or overlap slightly as seen in FIG. 8. The spacing between the brush assemblies 51 and 52 is adjusted until the desired gripping action is achieved to skin the foot and leg parts FLP without damaging the underlying meat and ligaments in the feet FT.

The shackle guide arrangement 15 best seen in FIGS. 1, 3, and 4 includes an upper shackle guide 134 mounted on the mounting plates 96 and 98 above the upper brush assembly 51. Appropriate guide mounting arrangements 135 seen in FIG. 3 are provided to adjustably connect the guide to the plates 96 and 98. The shackle guide 134 is provided with an elongate guide surface 136 thereon facing the shackles SS passing along the processing path $P_P$ to engage and limit the travel of the shackles SS toward the brush assemblies 51 and 52. The guide surface 136 has an outwardly curved inlet section 138 to guide the shackles SS into position and a straight elongate positioning section 139 to keep the shackles SS in position as they pass through the apparatus 10.

The shackle guide arrangement 15 also includes an infeed guide member 140 best seen in FIGS. 3 and 4 positioned at the upstream end of the apparatus 10 to guide the shackles SS into position between the shackle facing side surface 141 on the depending flange 31 of the upper knuckle guide member 24. The infeed guide member 140 is generally L-shaped with the longer infeed guide leg 142 formed into an outwardly angled inlet section on its projecting end to insure that the shackles SS feed in between the member 140 and the guide members 24 and 25 and a relatively straight positioning section 145 to force the shackles SS up against the side surface 141 on the upper guide member 24. The shorter mounting leg 146 on the guide member 140 has a downwardly bent tang thereon seen in FIG. 4 pivotally mounted on the mounting plate 96 so that the guide member 140 can pivot about a vertical axis normal to the plane of the legs 142 and 146 of the member 140. A spring return mechanism 148 is provided to urge the guide leg 142 toward the upper guide member 24 but allow the leg 142 to pivot outwardly when the shackle SS passes thereby.

The shackle guide arrangement 15 also includes a lower shackle guide member 149 seen in FIGS. 3 and 4 which is mounted on the shackle facing side surface 141 on the depending flange 31 of the upper knuckle guide member 24 to deflect the shackles SS away from the locating edge 32 on the flange 31. The guide member 149 has a deflection surface 150 thereon that angles away from the side surface 141 beginning at a point just downstream of the infeed guide member 140 to a displacement surface 151 on the guide member 149 extending from the downstream end of the deflection surface 150 seen in FIG. 3 through the apparatus 10 so that the lower end of the shackles SS will be deflected a prescribed displacement distance $D_3$ best seen in FIG. 6 laterally of the first prescribed location $L_1$ at which the hock knuckle HK is to be located. This insures that the location of the shackle SS will not interfere with the brush assemblies 51 and 52 engaging the feet FT to pull the hock knuckle HK up against the guide members 24 and 25 and positively hold the hock knuckle at the prescribed location $L_1$ as shackles SS move the foot and leg parts FLP along the processing path $P_P$ nor the severing operation to cut the foot FT from the foot and leg part FLP as will become more apparent.

The foot cutoff arrangement 14 includes a circular knife assembly 152 seen in FIGS. 4 and 5 positioned on that side of the guide members 24 and 25 opposite the brush assemblies 51 and 52 by a knife mounting arrangement 154 best seen in FIGS. 3 and 4. The knife assembly 152 includes a circular knife blade 155 best seen in FIGS. 5 and 6 commonly called a saw in the industry with a sharpened cutting edge 156 therearound. The knife blade 155 is mounted on a support arbor 158 which is in turn rotatably mounted on the knife mounting arrangement 154 for rotation about its central axis $AX_6$.

The knife mounting arrangement 154 seen in FIGS. 1, 3, and 4 includes a coarse height adjustment assembly 159 (FIG. 1), a lateral adjustment mechanism 160 (FIGS. 1 and 6) mounted on the coarse height adjustment assembly 159, a fine height adjustment mechanism 161 (FIGS. 4 and 6) mounted on the lateral adjustment mechanism 160, and a knife mounting plate 162 (FIGS. 1, 3, and 4) mounted on the fine height adjustment mechanism 161. The knife assembly 152 is mounted on the mounting plate 162.

The coarse height adjustment assembly 159 includes a front side frame tube assembly 164 seen in FIG. 1 mounted between the posts 18 on the near side of the shackles SS, by a pair of end height adjustment mechanisms 165. The tube assembly 164 includes an inside tube 166 slidable mounted in an outside tube 168 so that the length of the tube assembly 164 can be adjusted to match the distance between the posts 18. Tube locking fasteners 169 are provided to selectively fix the tubes 166 and 168 with respect to each other.

Each of the height adjustment mechanisms 165 includes a tubular slide member 170 slidably mounted on the associated post 18 with height adjustment locking fasteners 171 to selectively fix the slide member 170 vertically along the post 18. A pair of post side pivot ears 172 are provided on the slide member 170 that are pinned to the tube end pivot ear 174 on the end of the tube assembly 164 by pivot pin 175 so that the tube assembly 164 can pivot with respect to the end height adjustment mechanism 165 about the horizontal axis $AX_8$ of the pivot pin 175 that is oriented generally normal to the processing path $P_P$. This allows the height of opposite ends of the tube assembly 164 to be adjusted independently of each other so that the overall height of the circular knife assembly 152 can be adjusted and the attitude of the axis about which the knife assembly 152 is raised and lowered with respect to the vertical can be adjusted.

The lateral adjustment mechanism 160 best seen FIG. 4 mounted on top of the front side frame tube assembly 164 is oriented normal to the centerline $CL_2$ of tube assembly 164. The lateral adjustment mechanism 160 includes a generally horizontally extending lateral support tube 176 oriented normal to the tube assembly 164 and the processing path $P_P$ along which the shackles SS are moving. A lateral slide member 178 is slidably mounted in the tube 176 for movement toward and away from the poultry processing path $P_P$ along a horizontal adjustment axis $AX_9$ by a lateral adjustment screw and wheel unit 179. Lateral locking fasteners 180 are provided to selectively fix the position of the slide member 144 axially with respect to the lateral support tube 142. Thus, the lateral adjustment mechanism 160 moves the knife blade 155 along the axis $AX_9$ toward and away from the processing path $P_P$.

The knife mounting plate 162 seen in FIGS. 1, 3, and 4 includes a planar bearing mounting section 182 that mounts a pair of bearings 184 to rotatably support the knife support arbor 158 with the circular knife 155 positioned beyond one end of the plate 162. The plate 162 has an upstanding motor mount section 185 on that end opposite the knife blade 155 that mounts the drive motor 186 of the circular knife assembly 152. The drive motor 186 is connected to the end of the knife support arbor 158 by a coupling 188 seen in FIG. 4. That end of the plate 162 opposite the motor mount section 185 has a depending hinge mounting flange 189 thereon which is connected to the lateral adjustment slide member 178 of the lateral adjustment mechanism 160 by the fine height adjustment mechanism 161.

The fine height adjustment mechanism 161 best seen in FIGS. 4 and 6 includes a pivot hinge 192 pivotally connecting the hinge mounting flange 189 to the end of the slide member 178 about a generally horizontal pivot axis $AX_{10}$ normal to the rotational axis $AX_6$ of the knife support arbor 158 as seen in FIG. 6. A pivoting mechanism 194 adjustably connects the mounting plate 162 with the slide member 178 so that the pivotal position of the mounting plate 162 relative to the slide member 178 can be changed. It will thus be seen that the circular knife blade 155 can be raised and lowered in a coarse adjustment by raising and lowering the front side frame tube assembly 164 using the end height adjustment mechanisms 165 and that the final fine adjustment of the raising and lowering of the knife blade 155 is made using the pivoting mechanism 194.

The lower surface 198 on the lower shackle guide member 149 best seen in FIGS. 7 and 8 acts as a backup to the cutting edge 156 on the circular knife blade 155 to insure that the leg portion LP of the foot and leg part FLP will be severed by the knife blade 155. The lower shackle guide member 149 is provided with at least one recess 199 opening onto the surface 198 into which the cutting edge 156 on blade 155 projects to insure complete severing of the leg portion LP as it passes the knife blade 155.

The lateral distance $D_4$ between location $L_1$ and the cutting edge 156 of the knife 155 determines the position SP at which the leg portion LP will be severed. Since the distance between the hock knuckle HK and the leg spur LS is relatively constant with a flock of birds from the same house, using the hock knuckle HK as the reference point for the leg portion to be cut results in the accurately severing the leg portion relative to the leg spur LS as is indicated in FIG. 2.

Figure 9:
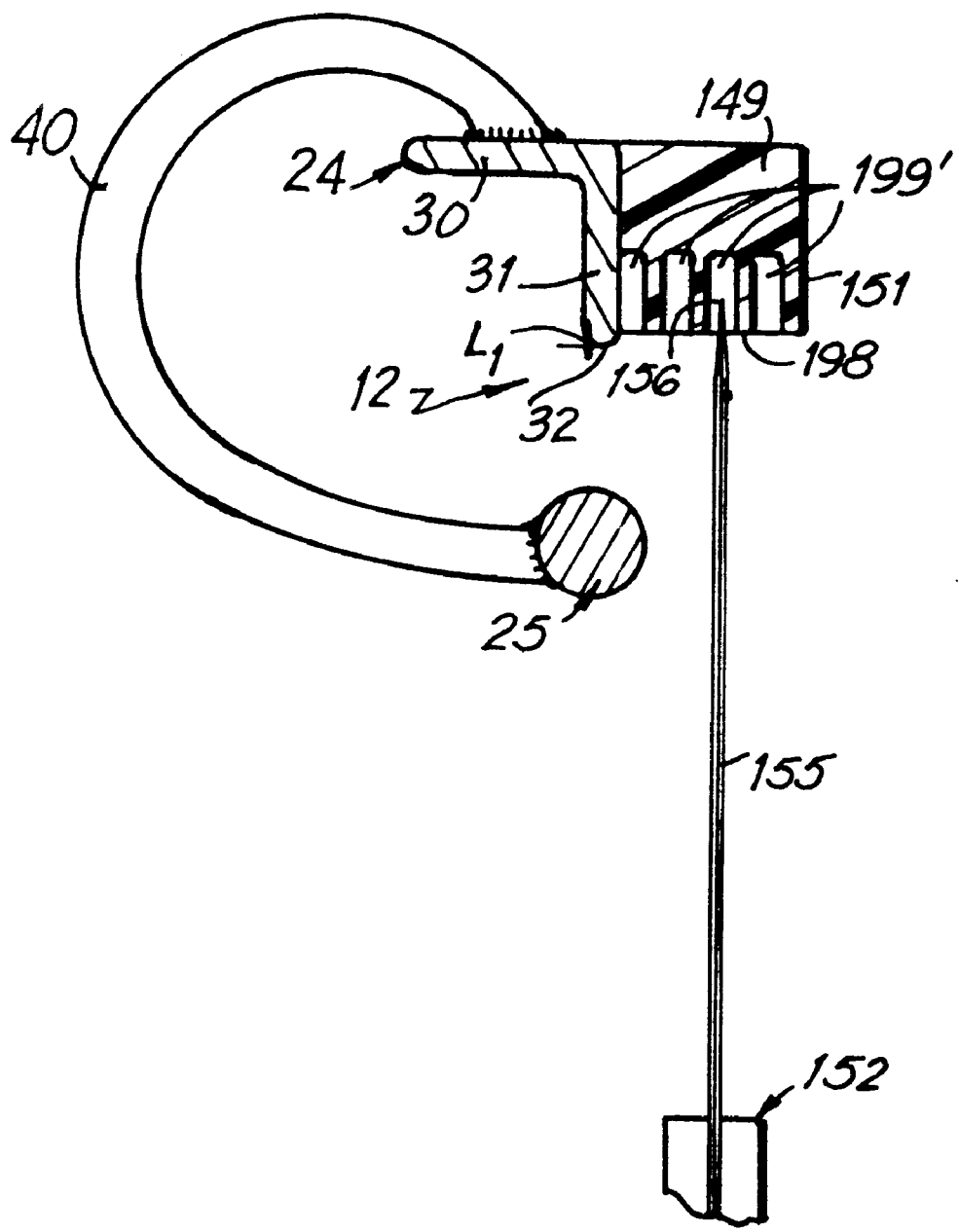
FIG. 9 is an enlarged cross-sectional view of a portion of FIG. 7 showing an alternative embodiment of the adjustment of the distance between the knuckle positioning means and the severing means.

To provide for adjustment for the distance $D_4$, the single recess 199 may be made wider as seen in FIG. 8 or a plurality of recesses 199' as seen in FIG. 9 at different spacings from the abutment edge 32 may be provided. This allows the lateral adjustment screw and wheel unit 179 of the lateral adjustment mechanism 160 to be used to selectively adjust the distance $D_4$. When the plurality of recesses 199' as seen in FIG. 9 are provided, it will be necessary to lower and re-raise the cutting edge 156 of the blade 155 each time an adjustment is made.

It will be seen that the cutoff knife assembly 152 is positioned intermediate the ends of the brush assemblies 51 and 52. Those portions 200 of the brush assemblies 51 and 52 upstream of the cutoff knife assembly 152 as seen in FIGS. 1 and 6 engage the feet FT of the foot and leg parts FLP after the leg portion LP is captivated between the upper and lower guide members 24 and 25 to pull the hock knuckle HK up against the locating edge 32 on the guide member 24 and to also pull the skin off of the leg portion LP and foot FT provided the skin is still loosened from scalding. The brush assemblies 51 and 52 continue to hold the foot and leg part FLP against the guide members 24 and 25 as the leg portion LP is being severed as seen in FIG. 7. Those portions 201 of the brush assemblies 51 and 52 downstream of the cutoff knife assembly 152 as seen in FIGS. 1 and 8 serve to pull the severed foot FT and attached leg portion LP out of the shackle SS to unload it. The hock knuckle HK falls away when the leg portion LP is severed so that the foot FT with attached leg portion LP is free to be pulled out of the shackle SS as seen in FIG. 8. Thus, not only are the feet FT harvested in the apparatus 10, the feet FT are also inherently skinned and the shackles SS inherently unloaded.

To collect the skin removed from the foot and leg part FLP by the brush assemblies 51 and 52, a skin collection chute 205 is provided on that side of the brush assemblies opposite the guide members 24 and 25. The collection chute 205 extends from the entrance end of the brush assemblies 51 and 52 up to the vicinity of the cutoff knife assembly 152. To collect the severed feet FT, a foot collection chute 206 is provided on the opposite side of the guide members 24 and 25 downstream of the cutoff knife assembly 152. Alternatively, a single collection chute may be used to collect both the skin and the processed feet and these parts subsequently separated. A knuckle discharge chute 208 is provided on that side of the cutoff knife assembly 152 opposite the guide members 24 and 25 to collect the hock knuckles HK as they are cut off the leg portion LP of the foot and leg parts FLP by the knife assembly 152.

What is claimed as invention is:

1. Poultry foot harvesting apparatus for removing the feet from poultry foot and leg parts having the hock knuckle thereon comprising:
   a) positioning means comprising:
      a1) a pair of spaced apart guide bars defining a prescribed space therebetween, said prescribed space larger than the poultry leg between the hock knuckle and foot but smaller than the hock knuckle so that the hock knuckle will engage said guide members when the hock knuckle is forced toward said guide bars while the poultry leg is positioned in said prescribed space between said guide bars to locate the hock knuckle in a first prescribed location, and
      a2) foot engaging means including a pair of brush assemblies constructed and arranged to engage the feet of the poultry while the hock knuckles are engaged by said guide bars; and means for rotating said brush assemblies to force the poultry feet away from said guide bars and maintain the hock knuckle in said first prescribed location against said guide bars; and
   b) foot cutoff means for severing the leg a prescribed distance from said first prescribed location to recover the foot.

2. The foot harvesting apparatus of claim 1 wherein each of said brush assemblies includes a central support and a plurality of plastic bristle filaments mounted on said central support and projecting radially outwardly therefrom, said plastic bristle filaments constructed and arranged to remove the skin from the poultry feet as an incidence of forcing the feet away from said knuckle locating means.

3. The foot harvesting apparatus of claim 2 wherein said plurality of plastic bristle filaments are constructed and arranged to urge the poultry feet tangentially between said brush assemblies and axially along said brush assemblies.

4. The foot harvesting apparatus of claim 1 further including adjustment means for movably positioning said foot cutoff means relative to said guide bars to selectively change the prescribed distance from said first prescribed location that the poultry leg is severed.

5. The foot harvesting apparatus of claim 1 wherein said foot cutoff means includes a circular knife member defining a cutting edge therearound, means for rotating said knife member, and backup means for supporting the leg in opposition to said circular knife member so that the leg is forced into contact with said circular knife to sever the leg said prescribed distance from said first prescribed location.

6. The foot harvesting apparatus of claim 5 wherein said backup means includes an elongate backup member defining a backup surface thereon to engage the poultry leg in opposition to said knife member, said backup member defining at least one knife receiving recess therein into which a portion of said cutting edge of said knife member projects to insure that said knife member completely severs the poultry leg.

7. The foot harvesting apparatus of claim 1 for use in conjunction with an overhead conveyor including shackles for transporting poultry feet and leg parts along a prescribed processing path and further including:
   c) shackle guide means for guiding the shackles with the poultry feet and leg parts therein past said positioning means and said foot cutoff means so that said positioning means positions the poultry feet and leg parts independently of the shackles as the shackles move the poultry feet and leg parts past said positioning means and the shackles are displaced out of interference with said foot cutoff means as the shackles move the poultry feet and leg parts past said foot cutoff means.

8. Poultry foot harvesting apparatus for removing the feet from poultry foot and leg parts carried in shackles by an overhead conveyor comprising:
   a) a pair of elongate brush assemblies oriented parallel to each other and adapted to frictionally engage the feet of the foot and leg parts carried by the shackles; and means for rotating said brush assemblies so as to exert a force on the foot and leg part to force the hock knuckle on the leg toward the shackle and the foot away from the shackle; and
   b) means for severing the leg between the shackle and hock knuckle so that the foot and leg part is inherently unloaded from the shackle when the leg is severed, said means for severing the leg located intermediate the length of said brush assemblies so that said brush assemblies remove the skin from the foot and leg part before the leg is severed and pull that portion of the leg attached to the foot after the leg is severed out of the shackle to unload the shackle.

9. The poultry foot harvesting apparatus of claim 8 wherein said brush assemblies are further constructed and arranged to simultaneously urge the foot on the foot and leg part away from the shackle and lengthwise of said brush assemblies.

10. The poultry foot harvesting apparatus of claim 9 wherein each of said brush assemblies includes:
   a cylindrical support member; and
   a plurality of elastomeric bristle filaments projecting generally radially from said cylindrical support member, said bristle filaments arranged in spirally around said cylindrical support member so that said bristle filaments engage the foot of the foot and leg part as said brush assembly is rotated to urge the foot and leg part tangentially between said brush assemblies and lengthwise of said brush assemblies.

11. The poultry foot harvesting apparatus of claim 10 further including bearing mounting means for rotatably mounting said brush assemblies about parallel axes of rotation lying a common plane, and pivot means for pivotally mounting said bearing mounting means about a bearing pivot axis so that said common plane containing said axes of rotation can pivot around said bearing pivot axis.

12. Poultry foot harvesting apparatus for removing the feet from poultry foot and leg parts carried in shackles by an overhead conveyor comprising:
   a) first means for exerting a force on each poultry foot and leg part carried by the shackles so as to force the hock knuckle on the leg toward the shackle and the foot away from the shackle;
   b) second means for severing the leg between the shackle and hock knuckle so that the foot and leg part is inherently unloaded from the shackle when the leg is severed; and
   c) third means for engaging the hock knuckle in opposition to first means so that said third means holds the hock knuckle in a prescribed location independently of the position of the shackle relative to the foot and leg part as said force is exerted on the foot and leg part by said first means, said second means severing the leg portion a prescribed distance from said prescribed location.

13. The poultry foot harvesting apparatus of claim 12 further adjustment means for movably positioning said severing means relative to said third means so that the distance between said prescribed location and said severing means can be varied.

14. A method of harvesting the feet from the leg and foot parts of poultry comprising the steps of:
   a) successively conveying each foot and leg part along a prescribed processing path while supported in shackles of an overhead conveyor;
   b) captivating each foot and leg part between a pair of guide bars located laterally of said prescribed processing path so that that portion of the leg between the shackle and hock knuckle freely passes between the guide bars while the hock knuckle on each foot and leg part is prevented from passing between said guide bars as each foot and leg part is conveyed along the processing path;
   c) engaging the foot of each foot and leg part between a pair of brush assemblies rotating about axes generally parallel to the processing path so that the bristles of said brush assemblies urge the foot away from said guide bars and the hock knuckle up against said guide bars as the foot and leg part is moved along the processing path to effectively position the leg and foot part laterally of the processing path independently of the shackle; and
   d) while the foot and leg part is held between the guide bars and the brush assemblies, severing the leg a prescribed distance from the guide bars and between the guide bars and the shackle to separate the foot from the poultry foot and leg part.

* * * * *